US008667149B2

(12) United States Patent
Kudo

(10) Patent No.: US 8,667,149 B2
(45) Date of Patent: Mar. 4, 2014

(54) COMMUNICATION DEVICE, COMMUNICATION METHOD, AND COMPUTER-READABLE STORAGE MEDIUM STORING COMMUNICATION PROGRAM

(75) Inventor: Yasuhiro Kudo, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 74 days.

(21) Appl. No.: 13/281,583

(22) Filed: Oct. 26, 2011

(65) Prior Publication Data

US 2012/0102210 A1      Apr. 26, 2012

(30) Foreign Application Priority Data

Oct. 26, 2010  (JP) ................................. 2010-239891

(51) Int. Cl.
*G06F 15/16*      (2006.01)
(52) U.S. Cl.
USPC ............................ 709/228; 709/203; 709/224
(58) Field of Classification Search
USPC .......................... 709/227–228, 203, 238, 224
See application file for complete search history.

(56) References Cited

U.S. PATENT DOCUMENTS

| 2004/0008666 | A1* | 1/2004 | Hardjono ...................... 370/352 |
| 2005/0195950 | A1* | 9/2005 | Lee et al. .................... 379/88.19 |
| 2006/0155814 | A1* | 7/2006 | Bennett et al. ................ 709/207 |
| 2007/0076860 | A1* | 4/2007 | Lin .......................... 379/202.01 |
| 2007/0078986 | A1* | 4/2007 | Ethier et al. .................. 709/227 |
| 2007/0121595 | A1* | 5/2007 | Batni et al. .................... 370/356 |
| 2008/0049924 | A1* | 2/2008 | Gallant et al. ............ 379/220.01 |
| 2008/0220728 | A1* | 9/2008 | Seo ................................ 455/90.2 |
| 2009/0042538 | A1* | 2/2009 | Cho et al. ........................ 455/406 |
| 2009/0225745 | A1* | 9/2009 | Jackson et al. ................ 370/352 |
| 2010/0098040 | A1* | 4/2010 | Chu et al. ...................... 370/338 |
| 2010/0128707 | A1* | 5/2010 | Horio et al. ................... 370/338 |
| 2010/0217837 | A1* | 8/2010 | Ansari et al. .................. 709/218 |
| 2010/0228979 | A1  | 9/2010 | Kudo |

FOREIGN PATENT DOCUMENTS

JP      2010-212793 A      9/2010

OTHER PUBLICATIONS

J. Rosenberg, et al. "SIP Session Initiation Protocol" http://www.ietf.org/rfc/rfc3261.txt, Sep. 24, 2010.
Notification of Reasons for Rejection received in corresponding Japanese Patent Application No. 2010-239891, mailed Dec. 4, 2012.

* cited by examiner

*Primary Examiner* — Philip B Tran
(74) *Attorney, Agent, or Firm* — Banner & Witcoff, Ltd.

(57) ABSTRACT

A communication device performs P2P communication with the other communication device by establishing a session through a server, and includes a first transmitting portion, if the communication device operates as a called device requested to establish the session, upon the receiving a session start message from the other communication device, transmits to the other communication device a response message including information on a port for directly receiving data from the other communication device; a session establishing portion establishes the session by transmitting a control message to a port specified by information in the session start message or a response message received from the other communication device; a command accepting portion accepts a user's command permitting to receive from the other communication device; and a starting portion starts transmitting and receiving of data to and from the other communication device, upon the accepting of the command.

20 Claims, 18 Drawing Sheets

FIG. 5

```
INVITE sip:UserB@example.com SIP/2.0
From: UserA@example.com
To: UserB@example.com
Call-ID: 1234@example.com
Cseq: 1 INVITE
Content-Type: application/sdp v=0
o=- 7865109 7865109 IN IP4 192.168.0.1
s=-
c=IN IP4 192.168.0.1
t=0 0
m=audio 49274 RTP/AVP 0 9 96          —31
a=rtpmap:0 PCMU/8000
a=rtpmap:9 G722/8000                  —32
a=rtpmap96 speex/8000
m=video 49275 RTP/AVP 34 97           —33
a=rtpmap:34 H263/90000
a=rtpmap:97 H264/90000                —34
```

FIG. 7

```
INVITE sip:UserB@example.com SIP/2.0
From: UserA@example.com
To: UserB@example.com
Call-ID: 1234@example.com
Cseq: 1 INVITE
Content-Type: application/sdp
Supported: X-Control-Session ~~~ 37 v=0
o=- 7865109 7865109 IN IP4 192.168.0.1
s=-
c=IN IP4 192.168.0.1
t=0 0
m=audio 49274 RTP/AVP 0 9 96 ~~~ 31
a=rtpmap:0 PCMU/8000   ⎫
a=rtpmap:9 G722/8000   ⎬── 32
a=rtpmap96 speex/8000  ⎭
m=video 49275 RTP/AVP 34 97 ~~~ 33
a=rtpmap:34 H263/90000 ⎫── 34
a=rtpmap:97 H264/90000 ⎭
```

FIG. 8

```
SIP/2.0 200 OK
From: UserA@example.com
To: UserB@example.com
Call-ID: 1234@example.com
Cseq: 1 INVITE
Content-Type: application/sdp
Require: X-Control-Session  ～44 v=0
o=- 5590053 5590053 IN IP4 192.168.0.3
s=-
c=IN IP4 192.168.0.3
t=0 0
m=audio 0 ⎫
m=video 0 ⎬————————— 41
m=x-control-session 50513 udp ～42
```

FIG. 9

```
ACK sip:UserB@example.com SIP/2.0
From: UserA@example.com
To: UserB@example.com
Call-ID: 1234@example.com
Cseq: 1 ACK
Content-Type: application/sdp
Require: X-Control-Session v=0
o=- 5590053 5590053 IN IP4 192.168.0.3
s=-
c=IN IP4 192.168.0.3
t=0 0
m=x-control-session 49273 udp
```
~43

FIG. 16

```
INVITE sip:UserB@example.com SIP/2.0
From: UserA@example.com
To: UserB@example.com
Call-ID: 1234@example.com
Cseq: 1 INVITE
Content-Type: application/sdp
Require: X-Control-Session v=0
o=- 7865109 7865109 IN IP4 192.168.0.1
s=-
c=IN IP4 192.168.0.1
t=0 0
m=x-control-session 49273 udp
```
～51

FIG. 17

```
SIP/2.0 200 OK
From: UserA@example.com
To: UserB@example.com
Call-ID: 1234@example.com
Cseq: 1 INVITE
Content-Type: application/sdp
Require: X-Control-Session v=0
o=- 5590053 5590053 IN IP4 192.168.0.3
s=-
c=IN IP4 192.168.0.3
t=0 0
m=x-control-session 50513 udp
```
~53

COMMUNICATION DEVICE, COMMUNICATION METHOD, AND COMPUTER-READABLE STORAGE MEDIUM STORING COMMUNICATION PROGRAM

CROSS-REFERENCE TO RELATED APPLICATION

This application claims priority from JP2010-239891, filed on Oct. 26, 2010, the content of which is hereby incorporated by reference.

BACKGROUND

The present disclosure relates to a communication device, a communication method, and a computer-readable storage medium that stores a communication program that are used by a communication system that performs peer-to-peer (P2P) communication between a plurality of communication devices.

A technology is known that, in order for a plurality of communication devices to perform P2P communication, establishes a session between the communication devices. A Session Initiation Protocol (SIP) has been disclosed that is a connection protocol for establishing a session between the communication devices. Because a session can be established easily by following the SIP, the SIP is widely used.

Generally speaking, in the SIP, a session is established between the communication devices through a server that processes a SIP request. First, a communication device on a calling side (hereinafter called the calling device) transmits to the server a session start message (a call request, or INVITE) that includes offer information. The offer information includes information on a port that will be used for receiving media data, information on types of media that can be received (for example, codecs for audio and video), and the like. The server takes the session start message that has been received from the calling device and transmits (forwards) it to a partner communication device (hereinafter called the called device) with which the session will be established. The called device, upon receiving the session start message through the server, repeatedly transmits a provisional response message, 180 Ringing, through the server to the calling device, until a receiving permission command is input by a user. When the receiving permission command is input, the called device selects the media type that it will use from the offer information that is included in the session start message. The called device includes information on the selected media type as answer information in a response message, 200 OK, and transmits it to the server. The server takes the response message it has received from the called device and transmits (forwards) it to the calling device. Based on the answer information that is included in the received response message, the calling device then transmits data directly to the called device, without going through the server. This establishes the session between the calling device and the called device.

SUMMARY

In the known method for establishing the session, it is necessary for the server to transmit and receive numerous messages until the establishing of the session is completed. Furthermore, until the establishing of the session is completed, the server must retain the information that is necessary for the establishing of the session. Therefore, in the known method for establishing the session, a problem exists in that the burden on the server is large.

The present disclosure provides a communication device, a communication method, and a computer-readable storage medium that stores a communication program that, in a case where a session is established between communication devices, reduce the burden on the server that mediates the establishing of the session.

In a first aspect of this disclosure, a communication device that, by establishing a session with another communication device through a server that performs transmitting and receiving of data, performs P2P communication with the other communication device, includes a first transmitting portion that, in a case where the communication device operates as a called device that is requested to establish the session by the other communication device, upon the receiving by the communication device of a session start message that has been transmitted through the server from the other communication device, transmits to the other communication device through the server a response message that includes information on a port for directly receiving data from the other communication device; a session establishing portion that establishes the session with the other communication device by transmitting a control message to a port that is specified by information in one of the session start message and a response message that has been received from the other communication device through the server; a command accepting portion that accepts a command of a user to the effect that receiving from the other communication device will be permitted; and a starting portion that, after the session has been established by the session establishing portion, upon the accepting of the command by the command accepting portion, starts transmitting and receiving of media data to and from the other communication device.

In a second aspect of this disclosure, a computer program product that is stored in a non-transitory computer-readable medium includes instructions for causing a processor of a communication device that, by establishing a session with another communication device through a server that performs transmitting and receiving of data, performs P2P communication with the other communication device to execute the steps of: transmitting to the other communication device through the server, in a case where the communication device operates as a called device that is requested to establish the session by the other communication device, upon the receiving by the communication device of a session start message that has been transmitted through the server from the other communication device, a response message that includes information on a port for directly receiving data from the other communication device; establishing the session with the other communication device by transmitting a control message to a port that is specified by information in one of the session start message and a response message that has been received from the other communication device through the server; accepting a command of a user to the effect that receiving from the other communication device will be permitted; and starting, after the session has been established and upon the accepting of the command, transmitting and receiving of media data to and from the other communication device.

In a third aspect of this disclosure, a communication method that is implemented by a communication device that, by establishing a session with another communication device through a server that performs transmitting and receiving of data, performs P2P communication with the other communication device, the communication method comprising the steps of: transmitting to the other communication device through the server, in a case where the communication device operates as a called device that is requested to establish the session by the other communication device, upon the receiving by the communication device of a session start message that has been transmitted through the server from the other communication device, a response message that includes information on a port for directly receiving data from the other communication device; establishing the session with the other communication device by transmitting a control message to a port that is specified by information in one of the session start message and a response message that has been received from the other communication device through the server; accepting a command of a user to the effect that receiving from the other communication device will be permitted; and starting, after the session has been established and upon the accepting of the command, transmitting and receiving of media data to and from the other communication device.

BRIEF DESCRIPTION OF THE DRAWINGS

Exemplary embodiments will be described below in detail with reference to the accompanying drawings in which:

FIG. 5 is a figure that shows an example of an INVITE message in a case where the calling device operates without following the immediate establishment procedure;

FIG. 7 is a figure that shows an example of the INVITE message in a case where the calling device operates in accordance with the immediate establishment procedure;

FIG. 8 is a figure that shows an example of a 200 OK message in a case where a called device operates in accordance with the immediate establishment procedure;

FIG. 9 is a figure that shows an example of a response ACK to the 200 OK that is shown in FIG. 8;

FIG. 16 is a figure that shows an example of the INVITE message according to the second embodiment;

FIG. 17 is a figure that shows an example of the 200 OK message according to the second embodiment.

DETAILED DESCRIPTION

Figure 1:
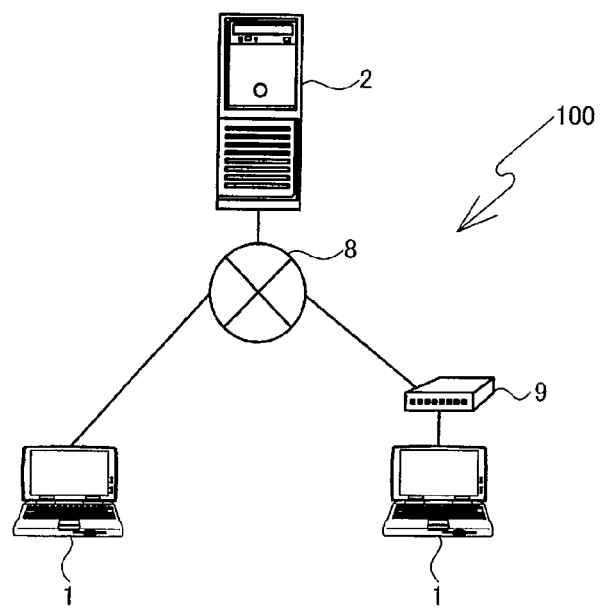
FIG. 1 is a figure that shows a system configuration of a communication system.

Hereinafter, a first embodiment of the present disclosure will be explained with reference to the drawings. The referenced drawings are used for explaining technological features that the present disclosure can use. Device configurations, flowcharts for various types of processing, and the like that are shown in the drawings are merely explanatory examples, and the present disclosure is not limited to the configurations, the flowcharts, and the like that are shown.

A system configuration of a communication system 100 will be explained with reference to FIG. 1. The communication system 100 is provided with a plurality of personal computers (hereinafter called the PCs) 1 and a SIP server 2. Each of the PCs 1 is connected to the SIP server 2 through an external network 8 such as the Internet or the like. The SIP server 2 establishes a session between the plurality of the PCs 1. The term "session" generally refers to a connection between communication devices from its start to its finish. In the present embodiment in particular, the term "session" refers to a state in which at least two of the PCs 1 can transmit and receive various types of data, such as control data, audio data, video data, and the like, to and from one another by peer-to-peer (P2P) communication. After the session has been established, the plurality of the PCs 1 carry out teleconferencing that uses video and audio by transmitting and receiving media data to and from one another. In other words, the communication system 100 according to the present embodiment is a video conferencing system that is used for conducting video conferences. However, the present disclosure can also be applied to a communication system other than a video conferencing system, such as a communication system that transmits and receives text data for implementing what is called a chat, a communication system that transmits and receives audio data for executing a telephone call, and the like. In the present disclosure, dedicated video conferencing terminals or the like can also be used as the communication devices, instead of the PCs 1.

The communication system 100 uses the Session Initiation Protocol (SIP) (RFC 3261) as a two-way protocol by which the plurality of the PCs 1 start communication over the external network 8. SIP is a protocol for establishing an end-to-end session over the external network 8, and it can easily implement real-time communication. The SIP server 2 processes a SIP request and establishes the session between the plurality of the PCs 1. During the teleconference, the audio data and the video data are transmitted and received directly between the plurality of the PCs 1 in accordance with the Real-time Transport Protocol (RTP).

As shown in FIG. 1, the PCs 1 are sometimes connected to the external network 8 through a Network Address Translation (NAT) router 9 and are sometimes connected to the external network 8 without going through the NAT router 9. The NAT router 9 performs two-way conversion between a private IP address that is used within a local network (for example, a LAN) and a global IP address that is used for the external network 8. The optimum method for establishing the session between the plurality of the PCs 1 may vary according to the communication circumstances. For example, the optimum method for establishing the session may vary according to whether the NAT router 9 is provided between the PC 1 and the external network 8. The method may also vary according to the type of the NAT router 9 that is connected. More specifically, in a case where the PC 1 is connected to the NAT router 9, it is not desirable for a large number of ports to be open, so it is good for a plurality of types of the media data to be tunneled through one port. However, if the PC 1 is not connected to the NAT router 9, a plurality of ports may be used. This will be described in detail later, but according to the PC 1 according to the present embodiment, the session can be established flexibly by the optimum method that accords with the communication circumstances.

Figure 2:
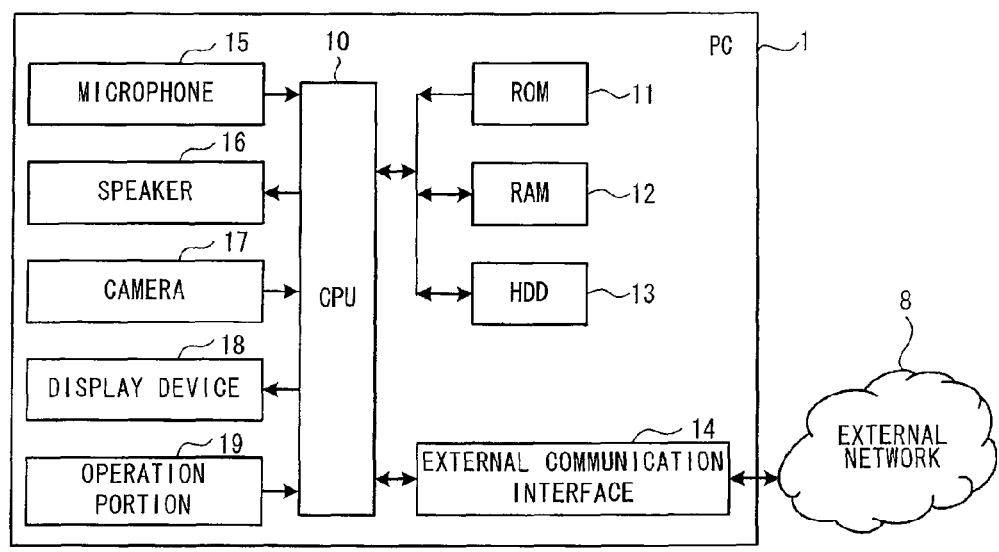
FIG. 2 is a block diagram that shows an electrical configuration of a PC 1.

An electrical configuration of the PC 1 will be explained with reference to FIG. 2. The PC 1 is provided with a CPU 10 that performs control of the PC 1. The CPU 10 is connected to a ROM 11, a RAM 12, a hard disk drive (hereinafter called the HDD) 13, an external communication interface 14, a microphone 15, a speaker 16, a camera 17, a display device 18, and an operation portion 19. The ROM 11 stores a program, an initial value, and the like for operating the PC 1. The RAM 12 temporarily stores various types of information that are used by a control program. The HDD 13 is a non-volatile storage device that stores various types of information, and it stores a communication program and the like according to the present disclosure. The external communication interface 14 connects the PC 1 to the external network 8.

The microphone 15 collects sound in the location where the PC 1 is disposed. The speaker 16 outputs sound. The camera 17 captures video of the location where the PC 1 is disposed. The display device 18 displays video. The operation portion 19 is operated by a user in order to input various types of commands to the PC 1.

Figure 3:
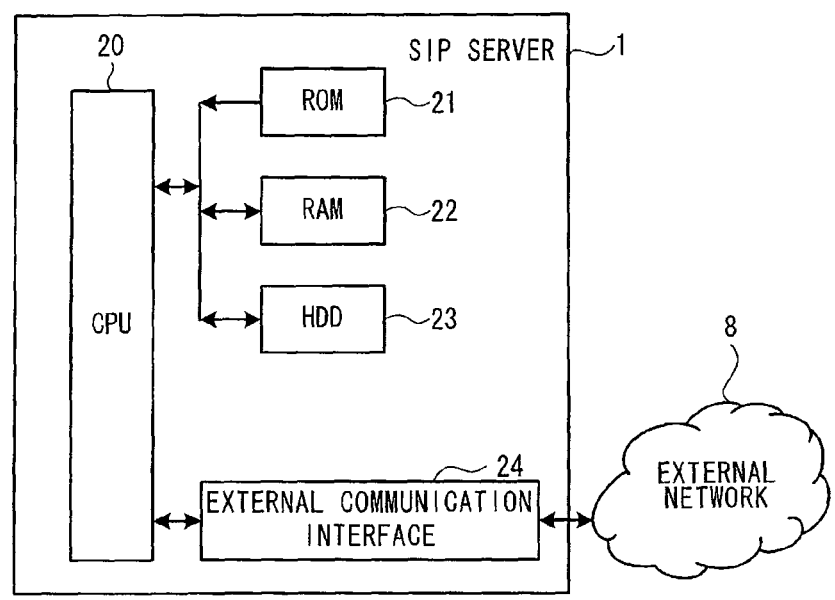
FIG. 3 is a block diagram that shows an electrical configuration of a SIP server.

An electrical configuration of the SIP server 2 will be explained with reference to FIG. 3. The SIP server 2 is provided with a CPU 20 that performs control of the SIP server 2. The CPU 20 is connected to a ROM 21, a RAM 22, a HDD 23, and an external communication interface 24. The ROM 21 stores a program, an initial value, and the like for operating the SIP server 2. The RAM 22 temporarily stores various types of information that are used by a control program. The HDD 23 is a non-volatile storage device that stores various types of information. The external communication interface 24 connects the SIP server 2 to the external network 8.

Figure 4:
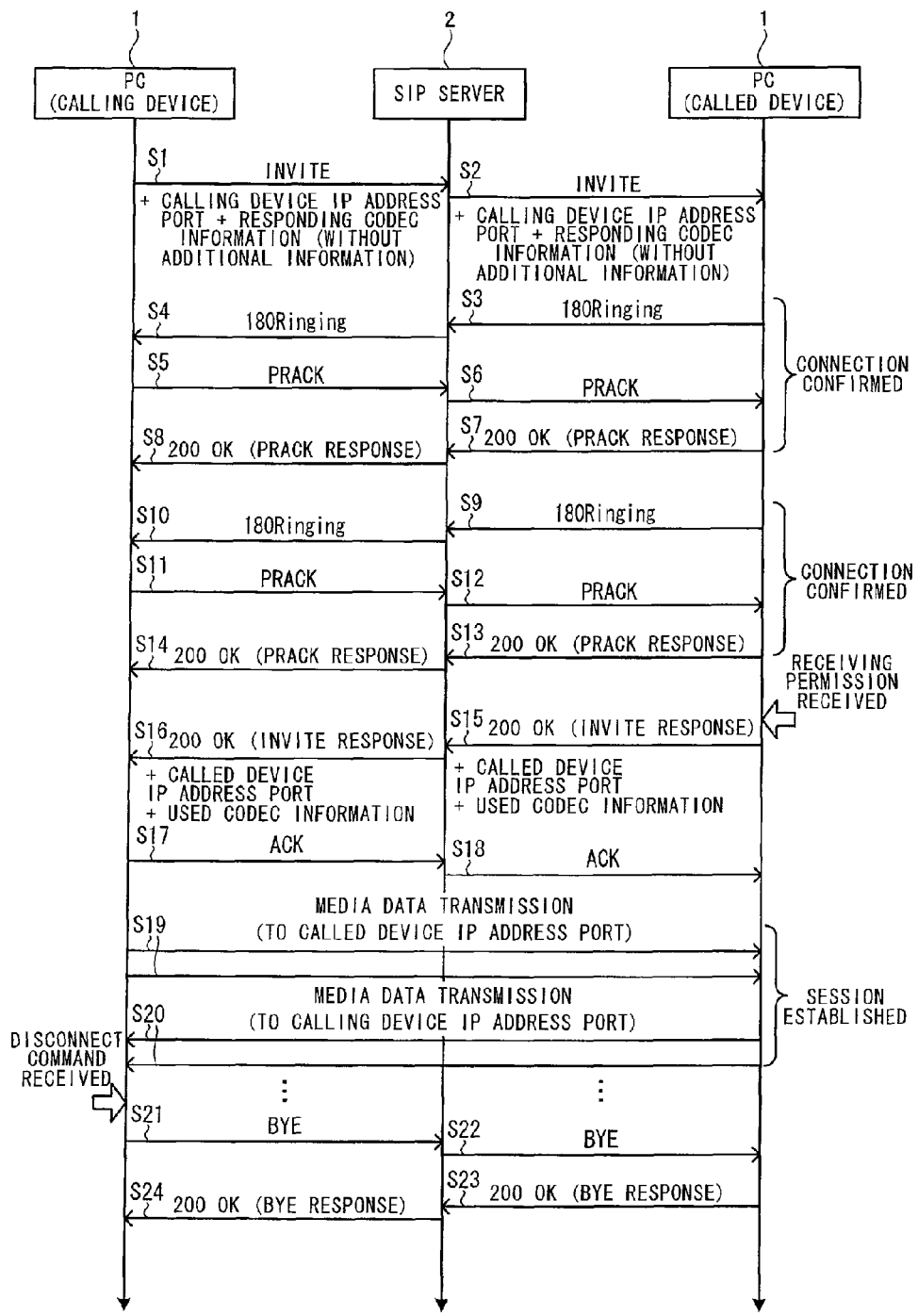
FIG. 4 is a sequence chart that shows a flow of processing in a case where a calling device operates without following an immediate establishment procedure.
Figure 6:
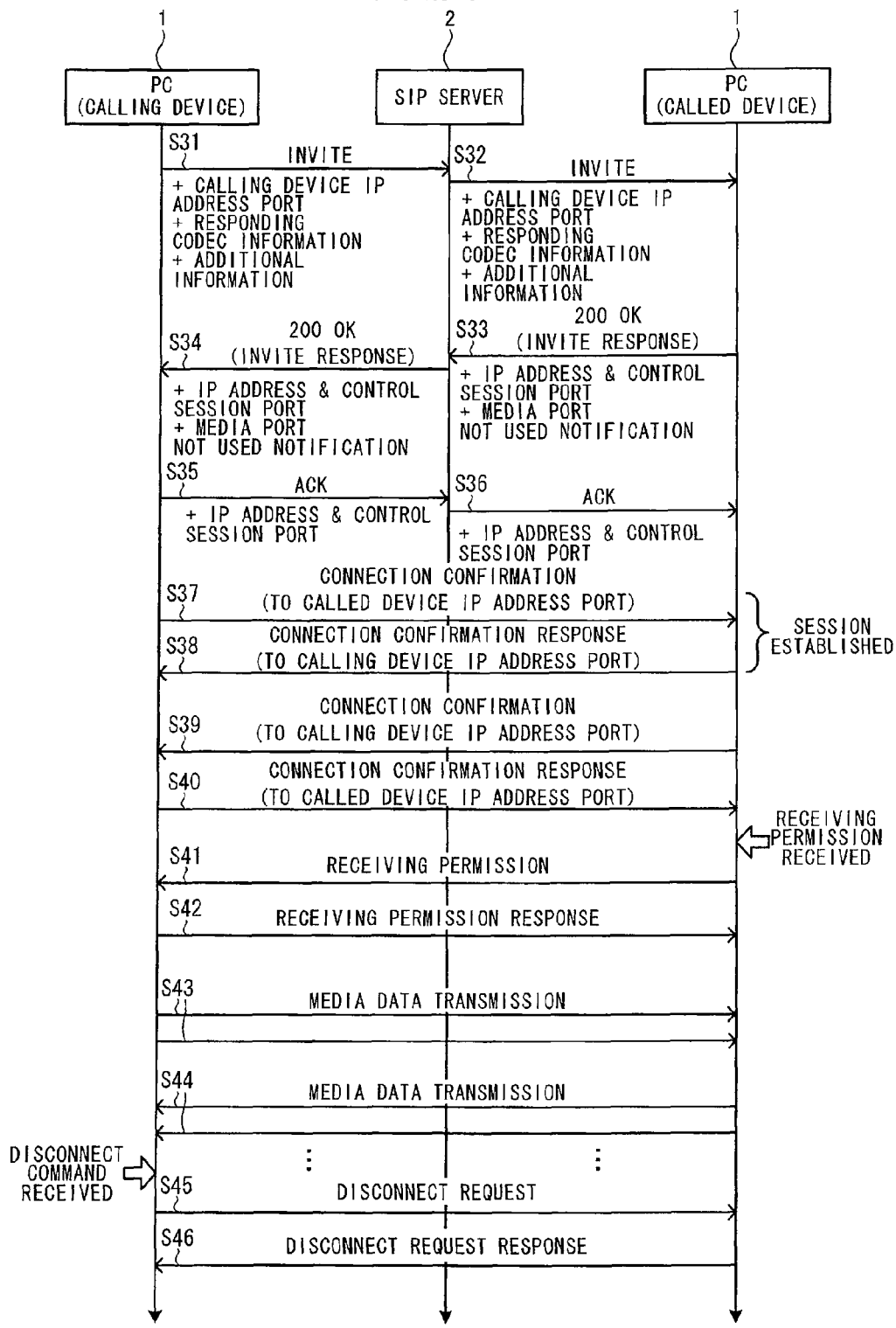
FIG. 6 is a sequence chart that shows a flow of processing in a case where the calling device operates in accordance with the immediate establishment procedure.

A flow of processing that is performed by the communication system 100 will be explained with reference to FIGS. 4 to 9. The processing that is hereinafter explained is performed by the CPU 10 of the PC 1 and the CPU 20 of the SIP server 2. Of the two PCs 1 that are shown in FIGS. 4 and 6, the PC 1 that requests the other PC 1 to establish the session is defined as the calling device. The PC 1 that is requested to establish the session by the other PC 1 is defined as the called device.

First, the flow of the processing in a case where the session is established according to a known ordinary session establishment procedure will be explained with reference to FIGS. 4 and 5. The PC 1 according to the present embodiment is able to establish a session between the two PCs 1 before a user of the called device inputs a receiving permission, in accordance with a procedure that establishes the session immediately (hereinafter called the immediate establishment procedure). Furthermore in a case where the PC 1 is operating as the called device, the PC 1 determines whether the calling device is compatible with the immediate establishment procedure. If the calling device is not compatible with the immediate establishment procedure, the PC 1 can establish the session in accordance with the known ordinary procedure. The sequence chart that is shown in FIG. 4 shows the flow of the processing in a case where the calling device is operating without following the immediate establishment procedure, as well as in a case where the calling device is not compatible with the immediate establishment procedure. Before performing the processing that is hereinafter described, each of the calling device and the called device transmits a registration request, or REGISTER, SIP message to the SIP server 2 and is registered in the SIP server 2 as one of the communication devices that will perform communication within the communication system 100.

When the user operates the operation portion 19 of the calling device and inputs a command to call the called device, the calling device transmits to the SIP server 2 a call request, or INVITE, that is a session start message (Step S1). The SIP server 2 forwards to the called device the session start message that has been received from the calling device (Step S2).

An example of the INVITE message that is transmitted at Steps S1, S2 is shown in FIG. 5. The INVITE message that is transmitted at Steps S1, S2 is the same as the INVITE message that is transmitted in the known ordinary session establishment procedure. For example, a character string 31 indicates a port number for a port that the calling device will use in an audio session. Character strings 32 indicate audio codecs with which the calling device is compatible. A character string 33 indicates a port number for a port that the calling device will use in a video session. Character strings 34 indicate video codecs with which the calling device is compatible. The INVITE message that is shown in FIG. 5 does not include additional information (which will be described in detail later) that indicates that the calling device is compatible with the immediate establishment procedure.

The INVITE that the called device has received through the SIP server 2 does not include the additional information, so the called device determines that the calling device is not compatible with the immediate establishment procedure. In this case, in response to the INVITE, the called device transmits a provisional response message, 180 Ringing, to the calling device through the SIP server 2 (Steps S3, S4). In response to the 180 Ringing, the calling device sends back a response message, PRACK, to the called device through the SIP server 2 (Steps S5, S6). In response to the PRACK, the called device transmits a response message, 200 OK, to the calling device through the SIP server 2 (Steps S7, S8). A connection confirmation between the calling device and the called device is performed by the processing at Steps S3 to S8 above. The called device performs the connection confirmation by transmitting the 180 Ringing to the calling device at regular intervals (Steps S9 to S14). In other words, in the known ordinary session establishment procedure, the timing at which the connection confirmation is performed is determined by the called device.

When the user operates the operation portion 19 of the called device and inputs a command to permit receiving, the called device, in response to the INVITE, transmits the response message 200 OK to the SIP server 2 (Step S15). The SIP server 2 takes the response message 200 OK it has received from the called device and forwards it to the calling device (Step S16). The 200 OK that is transmitted at Steps S15, S16 includes the IP address of the called device, the port number of the media port, and information on the codec that will be used. The media port is the port that the PC 1 will use in the media data session. The information on the codec that will be used is information that indicates which of the codecs with which the calling device is compatible will be used by the called device. In response to the 200 OK, the calling device sends back a response message, ACK, to the called device through the SIP server 2 (Steps S17, S18).

The calling device transmits the media data directly to the media port of which it was notified by the 200 OK that it received at Step S16 (Step S19). The called device transmits the media data directly to the media port of which it was notified by the INVITE that it received at Step S2 (Step S20). The session is thus established between the calling device and the called device, and the transmitting and the receiving of the media data are started. In the example that is shown in FIG. 4, the operation portion 19 of the calling device is then operated, and a disconnect command is input. The calling device transmits a BYE to the called device through the SIP server 2 (Steps S21, S22). In response to the BYE, the called device transmits the response message 200 OK to the calling device through the SIP server 2 (Steps S23, S24). The P2P communication between the calling device and the called device is thus terminated. Note that the BYE may also be transmitted from the called device to the calling device.

Because the PC 1 is able to establish the session in accordance with the known ordinary procedure, as described above, it is a general-purpose device. However, in the known procedure, the SIP server 2 must transmit and receive numerous messages until the session is established (Steps S1 to S18). Furthermore, until the establishing of the session is completed, the SIP server 2 must retain the information that is necessary for the establishing of the session. Therefore, in the known procedure, the burden on the SIP server 2 is large.

The flow of the processing in a case where the session is established in accordance with the immediate establishment procedure will be explained with reference to FIGS. 6 to 9. When a call command is input to the calling device in FIG. 6, the calling device transmits the call request INVITE, which is the session start message, to the called device through the SIP server 2 (Steps S31, S32).

An example of the INVITE message that is transmitted at Steps S31, S32 is shown in FIG. 7. In the same manner as the INVITE that is transmitted in the known ordinary session establishment procedure (refer to FIG. 5), the INVITE that is transmitted at Steps S31, S32 contains the character strings 31 to 34 that indicate the ports for directly transmitting and receiving the media data and also indicate the codec information (hereinafter called the media information). The INVITE that is transmitted at Steps S31, S32 also contains a character string 37 that includes the additional information that indicates that the calling device is compatible with the immediate establishment procedure.

The INVITE that the called device has received includes the additional information, so the called device determines that the calling device is compatible with the immediate establishment procedure. In this case, the called device, in response to the INVITE, immediately transmits the response message 200 OK to the calling device through the SIP server 2, regardless of whether the user has input a command to permit receiving (Steps S33, S34).

An example of the response message 200 OK that is transmitted at Steps S33, S34 is shown in FIG. 8. The response message 200 OK that is transmitted at Steps S33, S34 includes character strings 41 that indicate that the media information (the character strings 31 to 34 in FIG. 7) that was indicated by the INVITE from the calling device will not be used. In other words, the character strings 41 indicate that the media data will not be transmitted to the media port for which the calling device provided notification. As explained previously, the optimum method for establishing the session between the plurality of the PCs 1 may vary according to the communication circumstances, such as whether the NAT router 9 is provided and the like. According to the PC 1 according to the present embodiment, the called device can also transmit the media data to a port other than the media port for which the calling device provided notification, so the session can be established by the optimum method in accordance with the communication circumstances.

The 200 OK that is transmitted at Steps S33, S34 also includes, in a character string 42, a number for one port (a control session port) for receiving, directly from the calling device, a control message for establishing the session. Therefore, the called device is able to reduce the volume of the data that pass through the SIP server 2 from what it is with the known method, which includes information for a plurality of ports, such as the media port and the like, in the 200 OK. The called device can also reduce the possibility that information will leak, because it opens only one port, which is the minimum number of ports that is necessary in order to establish the session. The 200 OK that is transmitted at Steps S33, S34 also includes a character string 44 that includes information that requests the calling device to establish the session using the immediate establishment procedure. Accordingly, the calling device reliably recognizes that it will perform its processing in accordance with the immediate establishment procedure.

When the calling device that is shown in FIG. 6 receives the 200 OK through the SIP server 2, it responds to the 200 OK by sending back a response message ACK to the called device through the SIP server 2 (Steps S35, S36). An example of the response message ACK that is transmitted at Steps S35, S36 is shown in FIG. 9. The ACK that is transmitted at Steps S35, S36 includes, in a character string 43, a number for one control session port for receiving, directly from the called device, a control message for establishing the session. The port for which notification was provided as the media port in the INVITE that is shown in FIG. 7 may also be used for the control session port, and a port other than the media port may also be opened and used. Note that, in the same manner as the 200 OK that is shown in FIG. 8, the ACK includes a Require character string that requests the partner device to establish the session using the immediate establishment procedure.

Next, the calling device that is shown in FIG. 6 transmits directly to the control session port that was specified by the response message that was received at Step S34, without going through the SIP server 2, a connection confirmation message that is a control message for establishing the session (Step S37). The called device transmits directly to the control session port that was specified by the response message that was received at Step S36 a connection confirmation response message that is a control message (Step S38). A control session is thus established between the calling device and the called device. The control session is a session for transmitting and receiving control information that is necessary in order for the calling device and the called device to perform P2P communication. Note that in the example that is shown in FIG. 6, the calling device transmits the connection confirmation message first. However, the session may also be established by having the called device transmit the connection confirmation message first and having the calling device transmit the connection confirmation response message.

The calling device and the called device each include the media information for directly transmitting and receiving the media data in the control messages they transmit first to their partner PCs 1 (in the example that is shown in FIG. 6, the messages for confirming the connection that are transmitted at Steps S37 and S38). Specifically, the calling device and the called device each include the media port number for receiving the media data from their partner PCs 1 in the control messages, and also include the codec information. By including the media information in the control messages they transmit first, the calling device and the called device can deal promptly with a communication interruption or the like in a case where the codec conditions do not match. However, the present disclosure can be implemented even if the timing of the transmitting of the media information is changed.

The calling device and the called device each transmit the connection confirmation messages to their partner PCs 1 at intervals that they determine for themselves (for example, at Steps S37 and S39). The calling device and the called device each send back the connection confirmation response messages each time they receive the connection confirmation messages from their partner PCs 1 (for example, at Steps S38 and S40). As explained previously, in the known ordinary session establishment procedure, the timing at which the connection confirmation is performed (the timing at which the 180 Ringing is transmitted) is determined by the called device. However, according to the immediate establishment procedure, the connection confirmation message can also be transmitted freely from the calling device. Therefore, no problem occurs even in an environment where, for example, a firewall closes a port if the communication is not performed at a specified time.

When the user operates the operation portion 19 of the called device and inputs a command to permit receiving, the called device transmits a receiving permission message directly to the calling device (Step S41). The calling device sends back a receiving permission response message to the called device (Step S42). The transmitting and the receiving of the media data between the calling device and the called device are thus started (Steps S43, S44). When the operation portion 19 of one of the calling device and the called device is operated and a disconnect command is input, the PC 1 to which the disconnect command has been input (the calling device in the example that is shown in FIG. 6) transmits a disconnect request message directly to the partner PC 1 (Step S45). The PC 1 that has received the disconnect request message sends back a disconnect request response message (Step S46), and the P2P communication is terminated. In the present embodiment, unlike with the known technology, the disconnect request message is also transmitted and received directly between the PCs 1, without going through the SIP server 2, so the burden on the SIP server 2 can be reduced even more.

Figure 10:
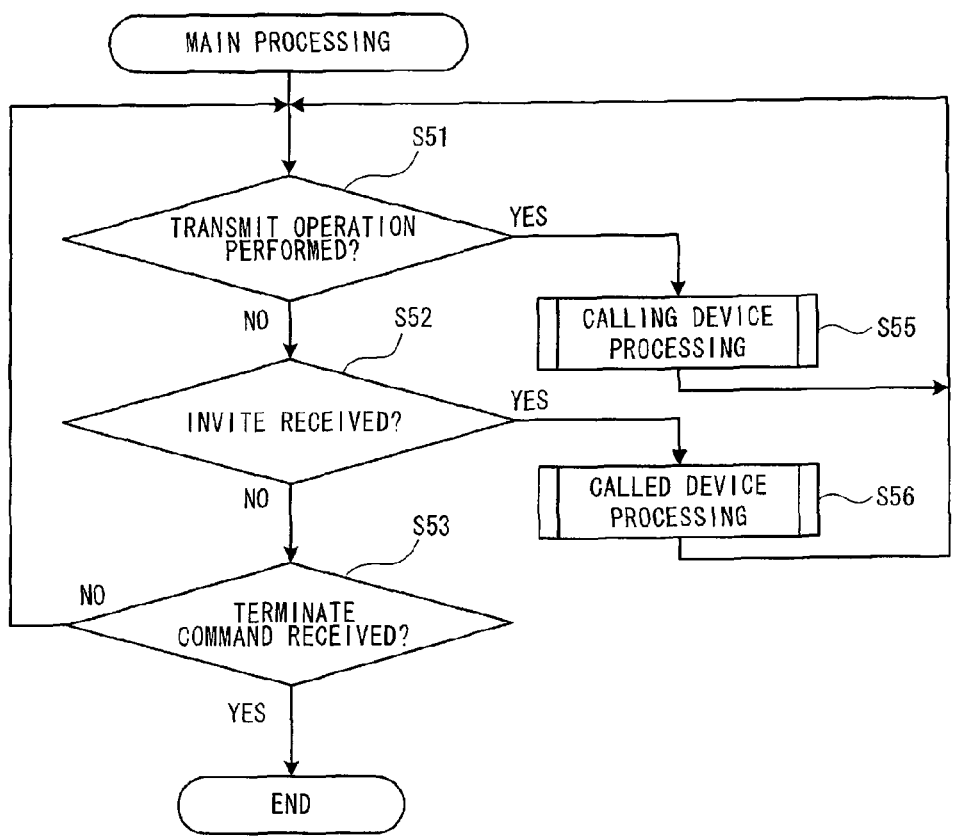
FIG. 10 is a flowchart of main processing that the PC 1 performs.

The processing that each of the PCs 1 performs in order to perform the processing of the communication system 100 that has been described above will be explained with reference to FIGS. 10 to 14. When the CPU 10 of the PC 1 has transmitted the registration request message REGISTER to the SIP server 2 and completed the registration with the SIP server 2, the CPU 10 performs main processing that is shown in FIG. 10. In the main processing, the CPU 10 determines whether an operation that inputs a command to transmit a call request (to call) has been performed on the operation portion 19 (Step S51). If the operation portion 19 has not been operated and the command to transmit the call request has not been input (NO at Step S51), the CPU 10 determines whether the call request INVITE has been received from the other PC 1 (Step S52). If the INVITE has not been received (NO at Step S52), the CPU 10 determines whether a command to terminate the connection with the SIP server 2 has been input to the operation portion 19 (Step S53). If the terminate command has not been input (NO at Step S53), the CPU 10 repeats the determinations at Steps S51 to S53. If the terminate command has been input (YES at Step S53), the main processing is terminated.

In a case where the operation that inputs the command to transmit the call request has been performed (YES at Step S51), the CPU 10 performs calling device processing (Step S55). The calling device processing is processing that is performed in a case where the PC 1 is operating as the calling device. In a case where the INVITE has been received from the other PC 1 (YES at Step S52), the CPU 10 performs called device processing (Step S56). The called device processing is processing that is performed in a case where the PC 1 is operating as the called device. Hereinafter, the calling device processing and the called device processing will be described in detail.

Figure 11:
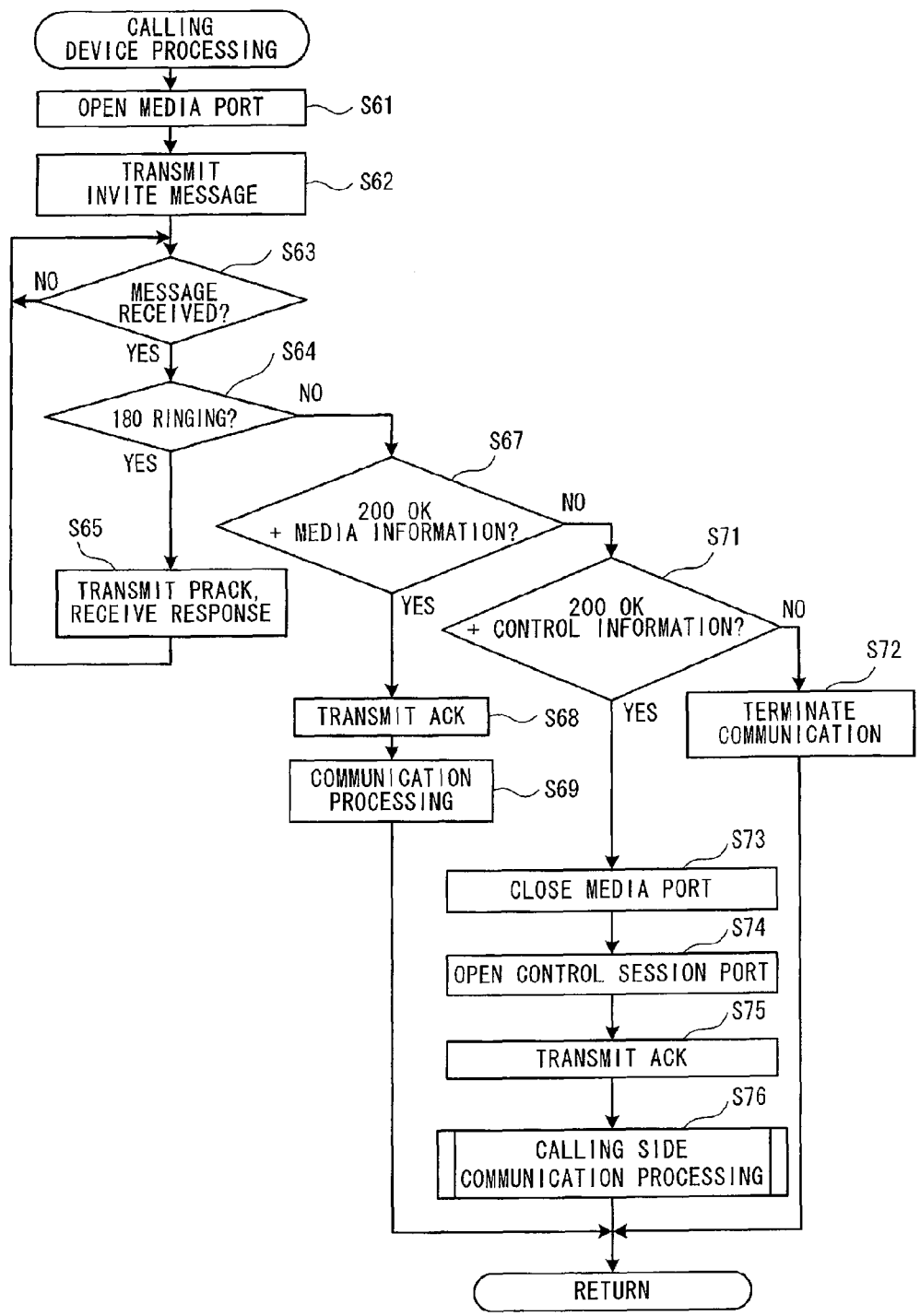
FIG. 11 is a flowchart of calling device processing that is performed within the main processing.

The calling device processing at Step S55 will be explained with reference to FIGS. 11 and 12. As shown in FIG. 11, the CPU 10 opens the media port (Step S61). As explained previously, the media port is the port that the PC 1 will use for the media data session. Next, the CPU 10 transmits the call request INVITE to the SIP server 2 (Step S62). The INVITE that is transmitted at Step S62 includes the number of the media port that was opened at Step S61, the codec information, and the like (refer to FIG. 7). In the INVITE, the CPU 10 may also include code key information that is necessary in order to decode the message. Note that the SIP server 2 forwards the INVITE to the PC 1 (the called device) that is specified in the INVITE message.

Next, the CPU 10 determines whether a message has been received from the called device (Step S63). If a message has not been received (NO at Step S63), the determination at Step S63 is repeated. In a case where a message has been received (YES at Step S63), the CPU 10 determines whether the received message is the 180 Ringing (Step S64). In a case where the called device is not compatible with the immediate establishment procedure and has transmitted the 180 Ringing in accordance with the known procedure (YES at Step S64), the CPU 10 transmits the response message PRACK to the called device through the SIP server 2 and receives the response message 200 OK from the SIP server 2 in response to the PRACK (Step S65). The processing then returns to the determination at Step S63.

If the received message is not the 180 Ringing (NO at Step S64), the CPU 10 determines whether the received message is the 200 OK that includes the media information (Step S67). As explained previously, in the known procedure, the response message 200 OK in response to the INVITE includes the media information (refer to Steps S15, S16 in FIG. 4). Therefore, in a case where the 200 OK that includes the media information has been received (YES at Step S67), the CPU 10, in accordance with the known procedure, sends back the response message ACK in response to the 200 OK through the SIP server 2 (Step S68) and performs communication processing (Step S69). In the communication processing, the media data are transmitted directly to the called device in accordance with the media information that was provided by the 200 OK. The media data are also transmitted directly from the called device, and the session is established. If a disconnect command is input to either one of the calling device and the called device, the communication processing (Step S69) is terminated, and the processing returns to the main processing.

In a case where the received message is not the 200 OK that includes the media information (NO at Step S67), the CPU 10 determines whether the 200 OK that includes the control information (refer to FIG. 8) has been received (Step S71). The control information is information on the number of the control session port for the called device to directly receive the control message. In a case where the received message is not the 200 OK that includes the control information (NO at Step S71), the received message is one of a receiving rejection notification message and an error message. Therefore, the CPU 10 terminates the communication (Step S72), and the processing returns to the main processing.

In a case where the received message is the 200 OK that includes the control information (YES at Step S71), the called device is compatible with the immediate establishment procedure. Therefore, the CPU 10 closes the media port that was opened at Step S61 (Step S73) and opens the control session port (Step S74). The CPU 10 transmits the response message ACK that includes the number of the control session port that has been opened (refer to FIG. 9) to the called device through the SIP server 2 (Step S75). Next, the CPU 10 performs calling side communication processing (Step S76), after which the processing returns to the main processing.

Figure 12:
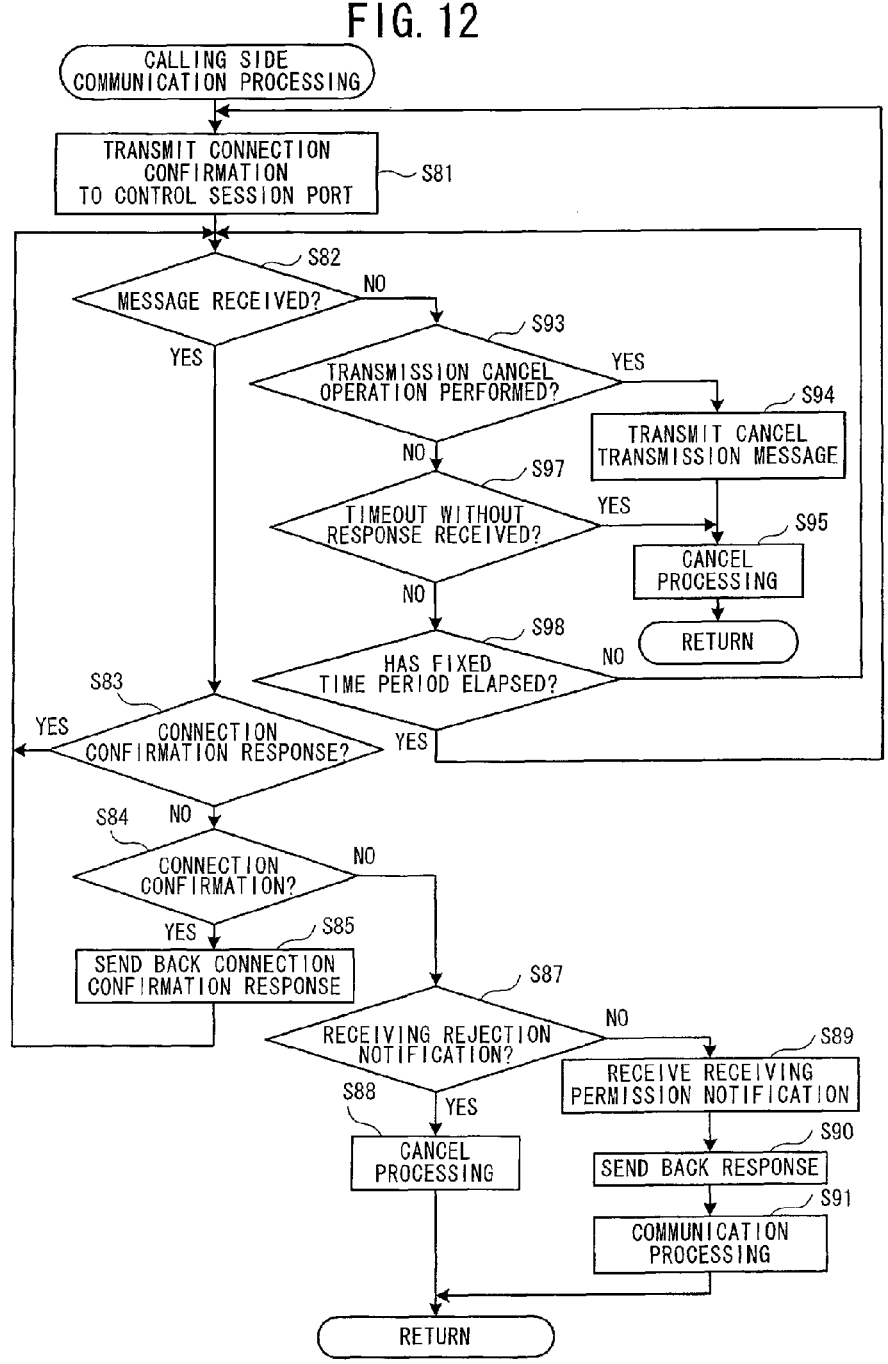
FIG. 12 is a flowchart of calling side communication processing that is performed within the calling device processing.

As shown in FIG. 12, when starting the calling side communication processing, the CPU 10 transmits the connection confirmation message to the control session port of which it was notified by the 200 OK (Step S81). Next, the CPU 10 determines whether a message has been received from the called device (Step S82). In a case where a message has been received (YES at Step S82), the CPU 10 determines whether the received message is a connection confirmation response message (Step S83). If the received message is a connection confirmation response message (YES at Step S83), the CPU 10 confirms that the connection is normal, and the processing returns to the determination at Step S82. At the point when the transmission and the receiving are completed for one of the connection confirmation message and the connection confirmation response message, the control session is established for transmitting and receiving various types of information that are necessary for the P2P communication.

If the received message is not a connection confirmation response message (NO at Step S83), the CPU 10 determines whether the received message is a connection confirmation message that was transmitted from the called device (Step S84). If the received message is a connection confirmation message (YES at Step S84), the CPU 10 sends back a connection confirmation response message directly to the called device (Step S85), and the processing returns to the determination at Step S82. Note that, as explained previously, the CPU 10 includes the media information in the one of the connection confirmation message and the connection confirmation response message that is transmitted first to the called device.

In a case where the received message is not a connection confirmation message (NO at Step S84), the CPU 10 determines whether the received message is a receiving rejection message (Step S87). The details will be explained later with reference to FIGS. 13 and 14, but if the user of the called device rejects receiving, the called device transmits a receiving rejection message to the calling device. If the received message is a receiving rejection message (YES at Step S87), the CPU 10 performs processing that cancels the calling operation (Step S88), and the processing returns to the calling device processing.

In a case where the received message is not a receiving rejection message (NO at Step S87), the received message is a receiving permission message. The CPU 10 receives the receiving permission message (Step S89) and sends back a receiving permission response message directly to the called device (Step S90). Next, the CPU 10 performs the communication processing (Step S91). In the communication processing (Step S91), the media data session is established in accordance with the media information that was provided by the one of the connection confirmation message and the connection confirmation response message, and the media data are transmitted and received directly. If a disconnect command is input, a BYE message or the like is transmitted and received directly between the two PCs 1, and the communication processing is terminated. The processing returns to the calling device processing.

If a message has not been received from the called device (NO at Step S82), the CPU 10 determines whether a transmission cancel operation has been performed on the operation portion 19 (Step S93). In a case where a transmission cancel operation has been performed (YES at Step S93), the CPU 10 transmits a transmission cancel message directly to the called device (Step S94) and performs processing that cancels the calling operation (Step S95). The processing returns to the calling device processing.

If a transmission cancel operation has not been performed (NO at Step S93), the CPU 10 determines whether a timeout has occurred without a connection confirmation response message being received (Step S97). In a case where a specified period of time has elapsed since the connection confirmation message was transmitted (at Step S81) without a connection confirmation response message being received at Step S83 (YES at Step S97), a normal connection has not been made. Therefore, the CPU 10 cancels the calling operation (Step S95), and the processing returns to the calling device processing.

If a timeout has not occurred (NO at Step S97), the CPU 10 determines whether a fixed period of time has elapsed since the connection confirmation message was transmitted (at Step S81) (Step S98). The fixed period of time is the transmission interval for the connection confirmation message, and the CPU 10 transmits the connection confirmation message every time the fixed period of time elapses. The time that is determined at Step S98 is longer than the time that is determined at Step S97. In a case where the fixed period of time has not elapsed (NO at Step S98), the processing returns to the determination at Step S82. In a case where the fixed period of time has elapsed (YES at Step S98), the CPU 10 transmits the connection confirmation message once again (Step S81). The connection confirmation message is transmitted repeatedly every time the fixed period of time elapses, until the calling operation is canceled or the communication is terminated.

Figure 13:
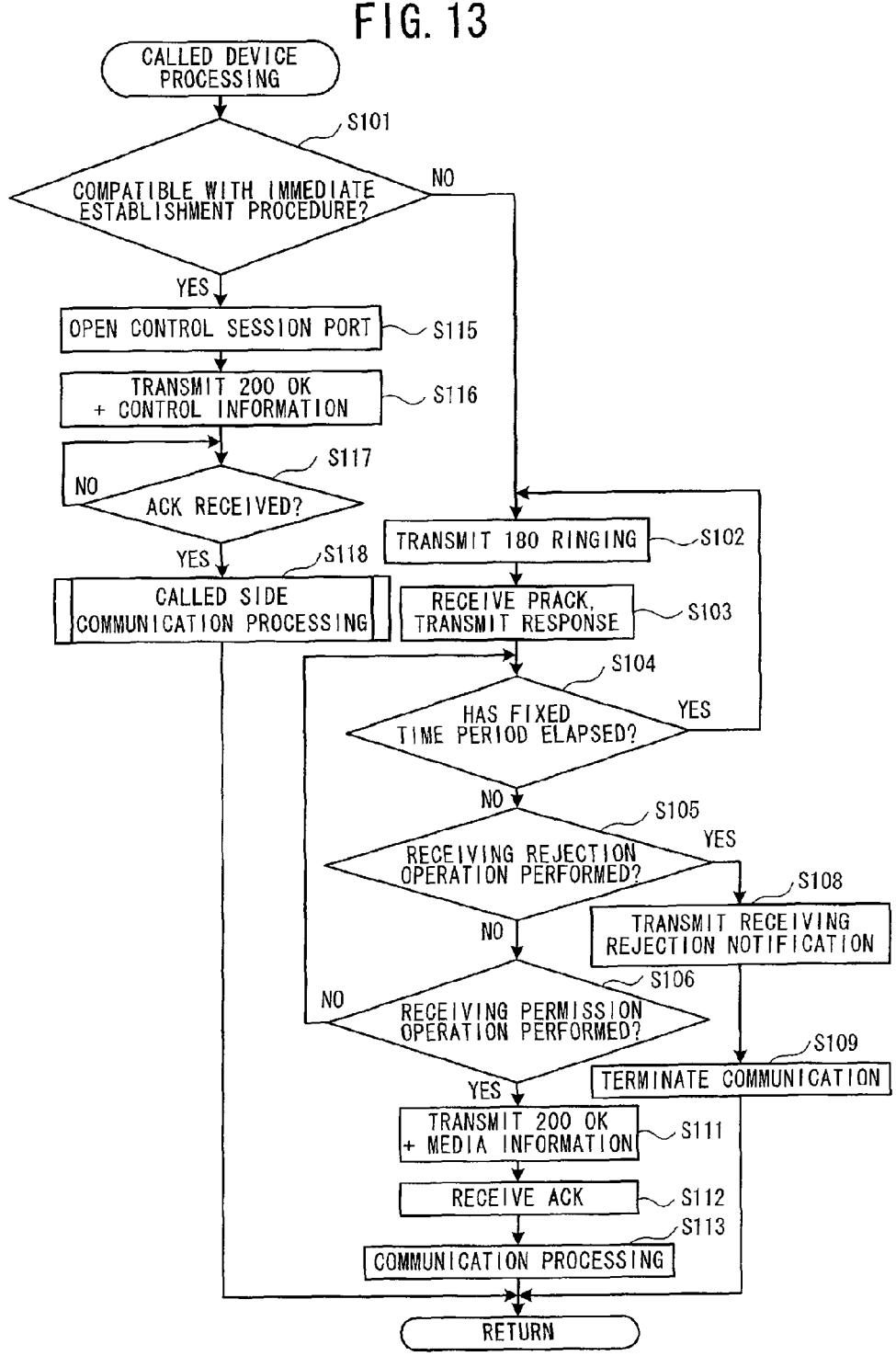
FIG. 13 is a flowchart of called device processing that is performed within the main processing.

The called device processing will be explained with reference to FIGS. 13 and 14. As explained previously, the CPU 10 performs the called device processing that is shown in FIG. 13 when the INVITE is received from the other PC 1 (the calling device). First, the CPU 10 determines whether the calling device is compatible with the immediate establishment procedure, according to the received INVITE message (Step S101). In the first embodiment, the CPU 10 determines whether the calling device is compatible with the immediate establishment procedure by determining whether the INVITE message includes the additional information (the character string 37 in FIG. 7).

In a case where the CPU 10 determines that the INVITE message does not include the additional information and that the calling device is not compatible with the immediate establishment procedure (NO at Step S101), the CPU 10 establishes the session in accordance with the known procedure. To be specific, the CPU 10 sends back the provisional response message 180 Ringing to the SIP server 2 (Step S102). The CPU 10 receives a PRACK through the SIP server 2 and sends back a response message in response to the PRACK (Step S103). Next, the CPU 10 determines whether a fixed period of time has elapsed that has been set as the transmission interval for the 180 Ringing (Step S104). If the fixed period of time has not elapsed (NO at Step S104), the CPU 10 determines whether an operation to input a receiving rejection command has been performed on the operation portion 19 (Step S105). If the receiving rejection operation has not been performed (NO at Step S105), the CPU 10 determines whether an operation to input a receiving permission command has been performed on the operation portion 19 (Step S106). If the receiving permission operation has not been performed (NO at Step S106), the processing returns to the determination at Step S104, and the determinations at Steps S104 to S106 are repeated.

In a case where the fixed period of time has elapsed (YES at Step S104), the 180 Ringing is once again transmitted to the SIP server 2, and the connection confirmation is performed (Steps S102, S103). In a case where the receiving rejection operation has been performed (YES at Step S105), the CPU 10 transmits the receiving rejection message to the calling device through the SIP server 2 (Step S108) and terminates the communication (Step S109). The processing then returns to the main processing. In a case where the receiving permission operation has been performed (YES at Step S106), the CPU 10 transmits the response message 200 OK that includes the media information to the calling device through the SIP server 2 (Step S111). The response message ACK is received from the calling device through the SIP server 2 (Step S112). In the same manner as at Step S69 in FIG. 11, the session is established, and the communication processing is performed (Step S113), after which the processing returns to the main processing.

In a case where it is determined that the INVITE message that has been received from the calling device does include the additional information and that the calling device is compatible with the immediate establishment procedure (YES at Step S101), the CPU 10 establishes the session in accordance with the immediate establishment procedure. Specifically, the CPU 10 opens the one control session port (Step S115). Regardless of whether the receiving permission operation has been performed or not, the CPU 10 transmits the response message 200 OK that includes the number of the control session port that has been opened to the calling device through the SIP server 2 (Step S116). The CPU 10 waits until it receives the ACK from the SIP server 2 (NO at Step S117). When the ACK is received (YES at Step S117), called side communication processing is performed (Step S118), after which the processing returns to the main processing.

Figure 14:
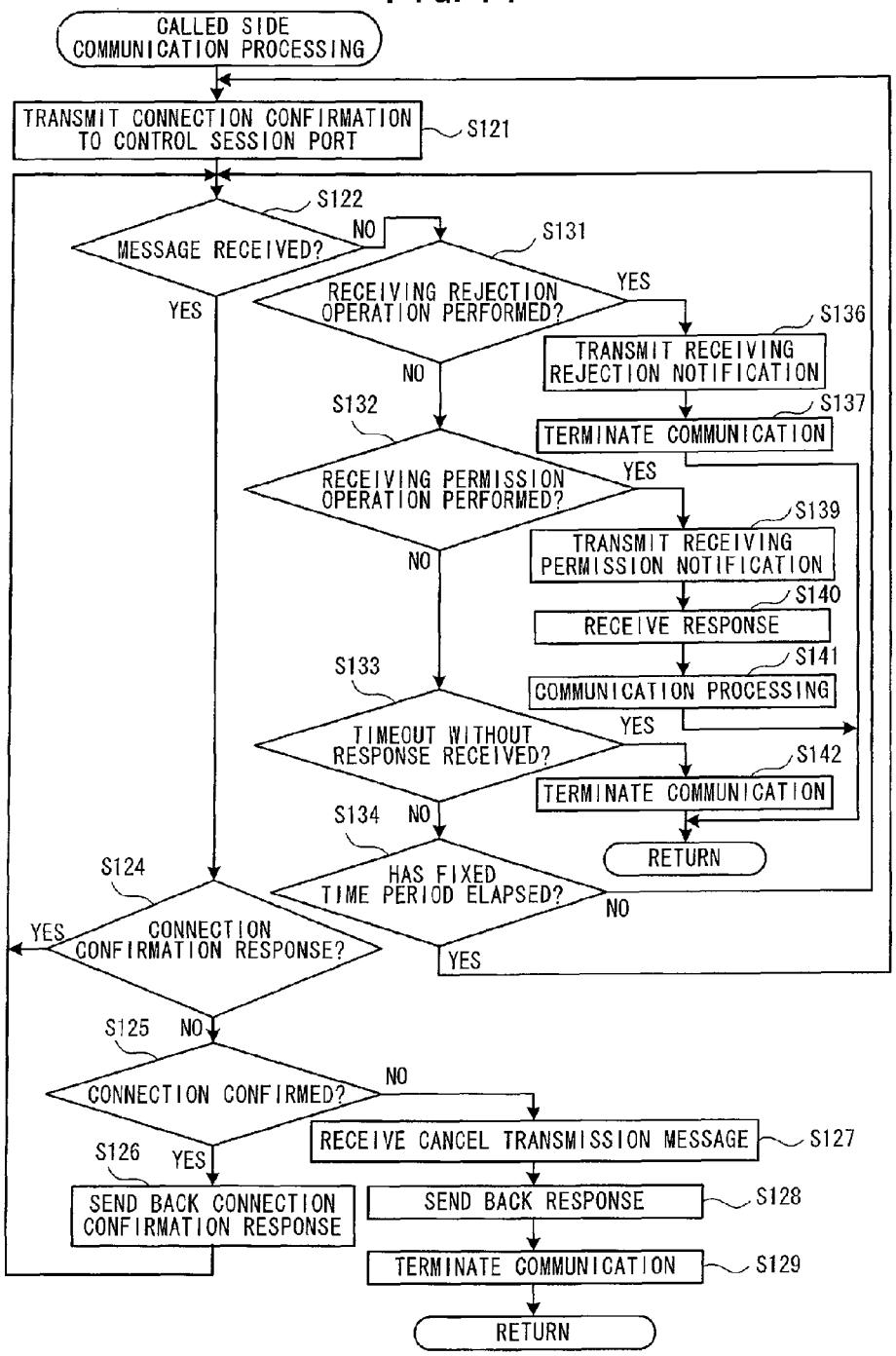
FIG. 14 is a flowchart of called side communication processing that is performed within the called device processing.

As shown in FIG. 14, when starting the called side communication processing, the CPU 10 transmits the connection confirmation message directly to the control session port that was specified by the received ACK message (Step S121). Next, the CPU 10 determines whether a message has been received from the calling device (Step S122). In a case where a message has been received (YES at Step S122), the CPU 10 determines whether the received message is a connection confirmation response message (Step S124). If the received message is a connection confirmation response message (YES at Step S124), the CPU 10 confirms that the connection is normal, and the processing returns to the determination at Step S122. At the point when the transmitting and the receiving are completed for one of the connection confirmation message and the connection confirmation response message, the control session is established for transmitting and receiving various types of information that are necessary for the P2P communication.

If the received message is not a connection confirmation response message (NO at Step S124), the CPU 10 determines whether the received message is a connection confirmation message that was transmitted from the calling device (Step S125). If the received message is a connection confirmation message (YES at Step S125), the CPU 10 sends back a connection confirmation response message directly to the calling device (Step S126), and the processing returns to the determination at Step S122. Note that, as explained previously, the CPU 10 includes the media information in the one of the connection confirmation message and the connection confirmation response message that is transmitted first to the calling device.

If the received message is not a connection confirmation message (NO at Step S125), the received message is a transmission cancel message. The CPU 10 receives the transmission cancel message (Step S127) and sends back a response message directly to the calling device (Step S128). The CPU 10 terminates the communication with the calling device (Step S129), and the processing returns to the called device processing.

Furthermore, if a message has not been received from the calling device (NO at Step S122), the CPU 10 determines whether the receiving rejection operation has been performed on the operation portion 19 (Step S131). In a case where the receiving rejection operation has been performed (YES at Step S131), the CPU 10 transmits the receiving rejection message directly to the calling device (Step S136). This makes it possible to make the burden on the SIP server 2 lighter than it is with the known procedure, which transmits an ERROR through the SIP server 2 when receiving is rejected. Next, the CPU 10 terminates the communication with the calling device (Step S137), and the processing returns to the called device processing.

If the receiving rejection operation has not been performed (NO at Step S131), the CPU 10 determines whether the receiving permission operation has been performed (Step S132). In a case where the receiving permission operation has been performed (YES at Step S132), the CPU 10 transmits the receiving permission message directly to the calling device (Step S139). The CPU 10 receives the receiving permission response message directly from the calling device (Step S140). Next, the CPU 10 performs the communication processing in the same manner as at Step S91 in FIG. 12 (Step S141). In the communication processing (Step S141), the media data session is established in accordance with the media information that was provided by one of the connection confirmation message and the connection confirmation response message, and the media data are transmitted and received directly. If a disconnect command is input, the communication processing is terminated, and the processing returns to the called device processing.

If the receiving permission operation has not been performed (NO at Step S132), the CPU 10 determines whether a timeout has occurred without a connection confirmation response message being received from the calling device (Step S133). In a case where a specified period of time has elapsed since the connection confirmation message was transmitted (at Step S121) without a connection confirmation response message being received at Step S124 (YES at Step S133), a normal connection has not been made. Therefore, the CPU 10 terminates the communication (Step S142), and the processing returns to the called device processing.

If a timeout has not occurred (NO at Step S133), the CPU 10 determines whether a fixed period of time has elapsed since the connection confirmation message was transmitted (at Step S121) (Step S134). In a case where the fixed period of time has not elapsed (NO at Step S134), the processing returns to the determination at Step S122. In a case where the fixed period of time has elapsed (YES at Step S134), the CPU 10 transmits the connection confirmation message once again (Step S121). The connection confirmation message is transmitted repeatedly every time the fixed period of time elapses, until the communication is terminated by a receiving rejection or the like, or until the communication is simply terminated.

As explained above, according to the PC 1 according to the first embodiment, the messages that are transmitted and received between the calling device and the called device through the SIP server 2 include information on the ports for receiving the data directly from the partner communication device. The calling device and the called device establish the control session based on the information on the ports that is included in the messages, regardless of whether the receiving permission command has been input to the called device. Therefore, the SIP server 2 is able to shorten the time that it retains the information that is necessary for establishing the session. In addition, the PC 1 is able to reduce the number of the messages that it transmits and receives through the SIP server 2 during the time until the session is established (for example, the messages for confirming the connection). Information other than the minimum information that is necessary in order to establish the control session can also be directly transmitted and received by the PC 1 to and from the partner communication device after the control session has been established. This reduces the volume of the data that are relayed through the SIP server 2. Therefore, the PC 1 is able to reduce the burden on the SIP server 2.

In a case where the PC 1 operates as the called device, the PC 1 includes the information on the one control session port for directly receiving the control messages in the response message 200 OK in response to the INVITE. This means that the information on the port that is included in the 200 OK is only information on the one port. Accordingly, a lower volume of data is relayed through the SIP server 2 than in a case where information on the media port and the like is included, so the burden on the SIP server 2 can be reduced even more. At the stage where it transmits the 200 OK, the called device opens only the one minimum necessary port. This reduces the possibility that the information will leak.

In a case where the PC 1 has received the INVITE, if the calling device is not compatible with the immediate establishment procedure, the PC 1 is able to send back the provisional response message 180 Ringing in accordance with the known ordinary method. Therefore, the PC 1 is able to establish the session by an appropriate method that is in accordance with the partner communication device. The PC 1 is able to determine properly whether the calling device is compatible with the immediate establishment procedure according to whether the INVITE includes the additional information.

In a case where the INVITE message includes the information on the media port, the PC 1 is able to include information in the 200 OK that indicates that it will not transmit the data to the media port of which it has been notified. Accordingly, the calling device may once again notify the called device that the media port for which it originally provided the notification will serve as the media port after the control session has been established, and it may also provide notification that a different port will serve as the media port. Accordingly, the PC 1 is able to transmit and receive the media data using the optimum port for the communication conditions.

A second embodiment of the present disclosure will be explained with reference to FIGS. 15 to 18. The PC 1 according to the second embodiment, in a case where it operates as the calling device, includes the number of the one control session port in the INVITE message, but it does not include the media information such as the number of the media port or the like. It is therefore useful in a case where the fact that the called device is compatible with the immediate establishment procedure has been made clear in advance. In the second embodiment, the configuration of the devices and all but a portion of the processing, such as the processing that transmits the INVITE and the like, are the same as the configuration and the processing in the first embodiment. Accordingly, for the processing and the configuration that are the same as in the first embodiment, the same numbers are assigned, and the explanations will either be omitted or simplified.

Figure 15:
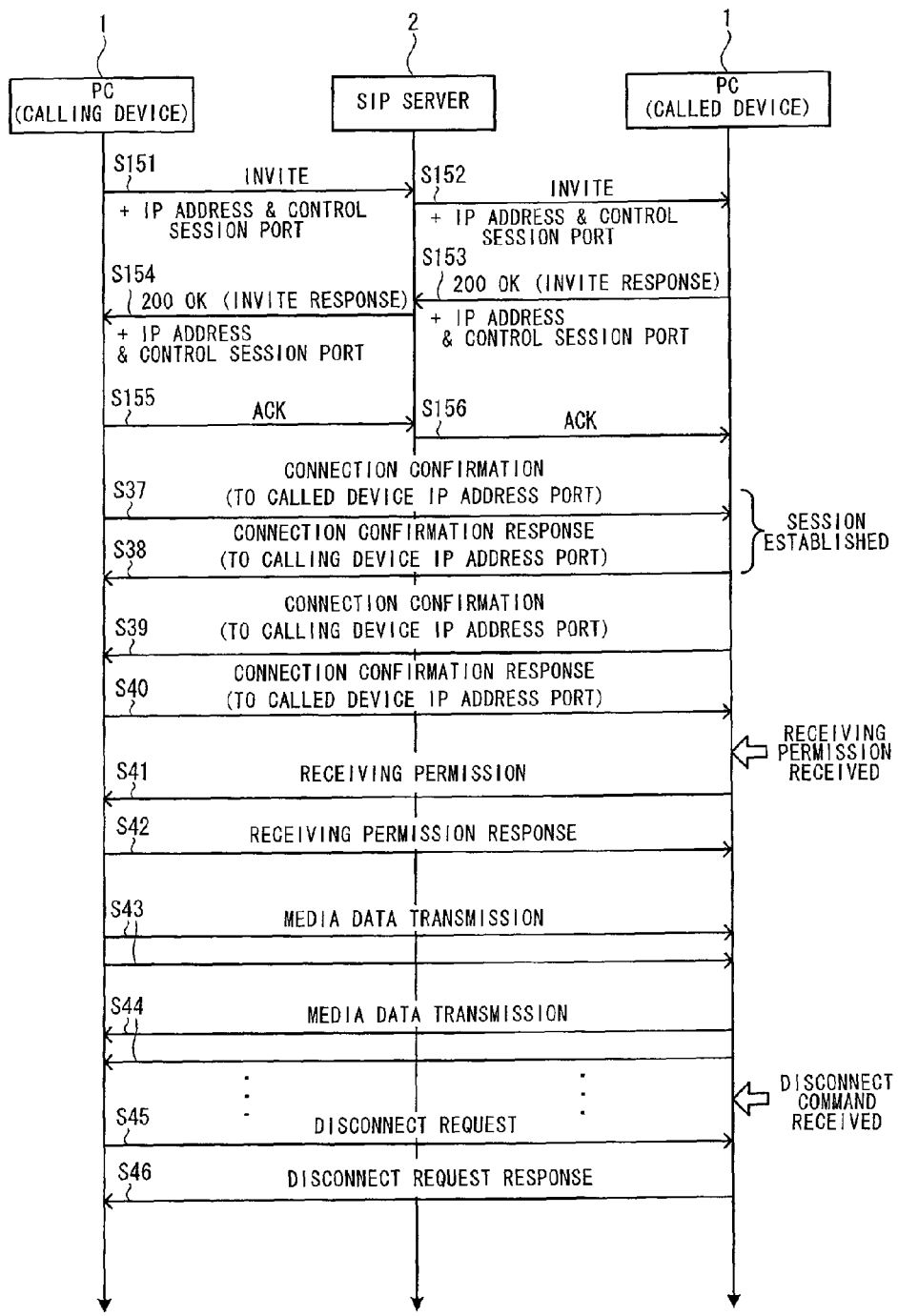
FIG. 15 is a sequence chart that shows a flow of processing in a communication system according to a second embodiment.

The flow of the processing that is performed by the communication system according to the second embodiment will be explained with reference to FIGS. 15 to 17. The processing that will hereinafter be explained is performed by the CPUs 10 of the PCs 1 and the CPU 20 of the SIP server 2. As shown in FIG. 15, when a call command is input to the calling device, the calling device transmits the call request INVITE, which is the session start message, to the called device through the SIP server 2 (Steps S151, S152).

An example of the INVITE message that is transmitted at Steps S151, S152 is shown in FIG. 16. Unlike the INVITE message that is transmitted in the first embodiment (refer to FIG. 7), the INVITE message that is transmitted at Steps S151, S152 does not include the information on the number of the media port and the codec (the media information) and includes only a character string 51 that indicates the number of the control session port. Therefore, the PC 1 is able to reduce the data volume of the messages it relays through the SIP server 2, so it can reduce the burden on the SIP server 2 even more. Furthermore, based on the fact that the INVITE includes only the character string 51 that indicates the number of the control session port, the called device can determine from the character string 51 that the calling device is compatible with the immediate establishment procedure.

As shown in FIG. 15, the called device, when it receives the INVITE, immediately transmits the response message 200 OK in response to the INVITE, regardless of whether the user has input a command to permit receiving (Steps S153, S154). The 200 OK is transmitted to the calling device through the SIP server 2. An example of the 200 OK message that is transmitted at Steps S153, S154 is shown in FIG. 17. The 200 OK message that is transmitted at Steps S153, S154 includes a character string 53 that includes the number of the one control session port for directly receiving, from the calling device, the control message for establishing the session. Note that unlike the 200 OK message in the first embodiment (refer to FIG. 8), in the second embodiment, it is not necessary to include information that indicates that the media information will not be used.

The calling device, when it receives the 200 OK through the SIP server 2, sends back to the called device, through the SIP server 2, the response message ACK in response to the 200 OK (Steps S155, S156). The calling device has already used the INVITE message to provide the number of the control session port to the called device, so it is not necessary to include the port number in the ACK message. The processing that follows at Steps S37 to S46 is the same as the processing that has been explained with reference to FIG. 6, so the explanation will be omitted here.

Figure 18:
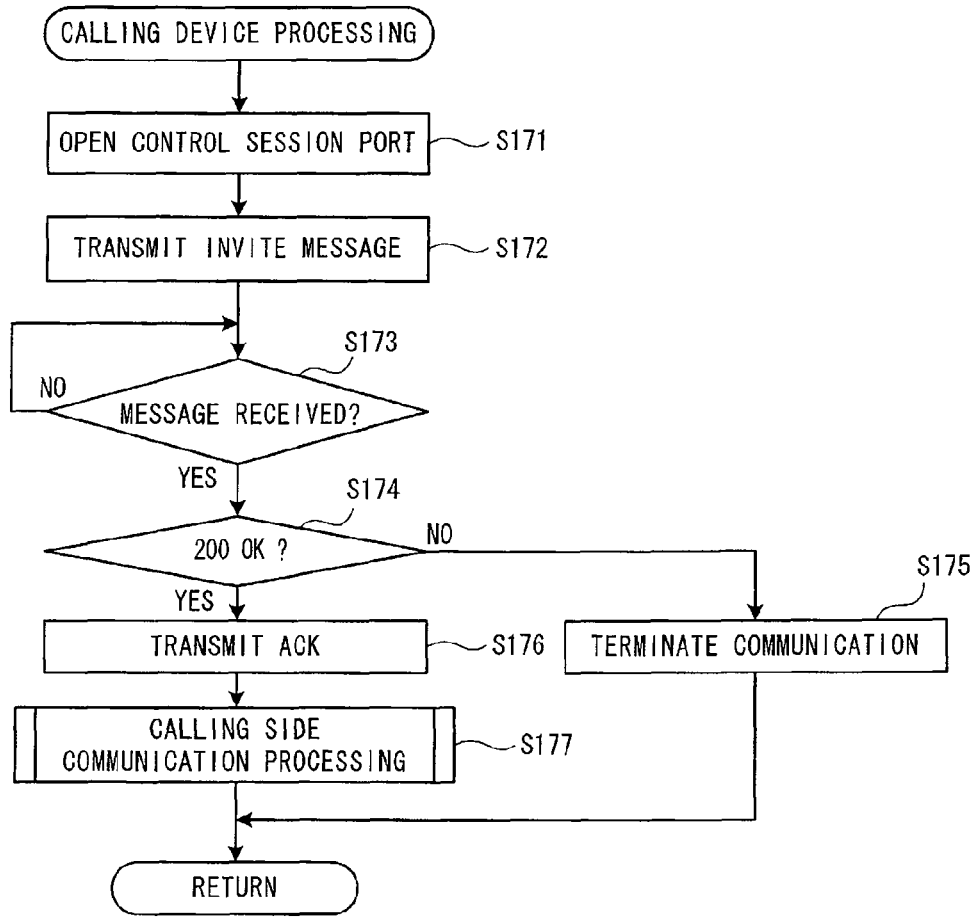
FIG. 18 is a flowchart of calling device processing that the PC 1 performs according to the second embodiment.

The processing that the PC 1 according to the second embodiment performs will be explained with reference to FIG. 18. The only points on which the second embodiment differs from the processing according to the previously described first embodiment are the calling device processing that is shown in FIG. 18 and the method for the determining that is shown at Step S101 in FIG. 13. Therefore, the explanations of the processing that is shared by the first embodiment will be omitted. As shown in FIG. 18, the CPU 10 that has started the calling device processing opens the control session port (Step S171). Next, the CPU 10 transmits the call request message INVITE, which includes the number of the control session port, to the called device through the SIP server 2 (Step S172).

The CPU 10 determines whether a message has been received from the called device (Step S173). If a message has not been received (NO at Step S173), the determination at Step S173 is repeated. If a message has been received (YES at Step S173), the CPU 10 determines whether the received message is the 200 OK (Step S174). If the received message is not the 200 OK (NO at Step S174), the received message is one of a receiving rejection notification message and an error message. Therefore, the CPU 10 terminates the communication (Step S175), and the processing returns to the main processing. If the received message is the 200 OK (YES at Step S174), the CPU 10 transmits the response message ACK in response to the 200 OK to the called device through the SIP server 2 (Step S176). The CPU 10 performs calling side communication processing (Step S177), after which the processing returns to the main processing. The calling side communication processing (Step S177) is the same as the calling side communication processing according to the first embodiment that is shown in FIG. 12.

Note that in the first embodiment, in the called device processing (refer to FIG. 13), the determination as to whether the partner PC 1 is compatible with the immediate establishment procedure is made according to whether the additional information has been provided (Step S101). In contrast, at Step S101 according to the second embodiment, the CPU 10 determines whether the INVITE message that has been received through the SIP server 2 includes the number of the control session port. If the INVITE message does not include the number of the control session port, the CPU 10 determines that the partner PC 1 is not compatible with the immediate establishment procedure (NO at Step S101) and transmits the 180 Ringing (Step S102). If the INVITE message does include the number of the control session port, the CPU 10 determines that the partner PC 1 is compatible with the immediate establishment procedure (YES at Step S101) and transmits the 200 OK immediately (Steps S115, S116).

As explained above, the PC 1 according to the second embodiment includes only the information on the one control session port in the INVITE that is the session start message. Therefore, the volume of the data that are relayed through the server can be further reduced from what it is in a case where the media information is included in the INVITE. The PC 1, in a case where it transmits the INVITE as the calling device, opens only the one minimum necessary port, so the possibility that the information will leak can be reduced. Furthermore, with the known session establishment method, the INVITE includes the media information, but it does not include the information on the control session port. The PC 1 according to the second embodiment is able to determine easily and properly whether the calling device is compatible with the immediate establishment procedure, according to whether the received INVITE includes the media information.

The present disclosure is not limited to the embodiments that have been described above, and various types of modifications are possible. For example, the PC 1 in the embodiments that have been described above utilizes the SIP message for transmitting and receiving some of the information. However, the present disclosure can also be implemented without utilizing the SIP message.

In the embodiments that have been described above, the 200 OK is immediately transmitted to the calling device, and the control session is established, regardless of whether the command to permit receiving has been input to the called device. Therefore, the PC 1 transmits and receives, directly to and from the partner PC 1, without going through the SIP server 2, the media information that is necessary for directly transmitting and receiving the media data, making it possible to reduce the burden on the SIP server 2. However, according to the present disclosure, the PC 1 can also transmit and receive information other than the media information between the PCs 1 without going through the SIP server 2. For example, the PC 1 can also transmit and receive control parameters such as the video frame rate, resolution, and the like without going through the SIP server 2. Accordingly, the burden on the SIP server 2 can be significantly reduced.

The PC 1 according to the first embodiment that has been described above, in a case where it operates as the called device, includes in the 200 OK message information to the effect that it will not use the media information that was provided by the INVITE message (refer to the character string 41 in FIG. 8, and to Step S116 in FIG. 13). Therefore, the calling device can promptly close the media port, which does not need to be used, improving security. However, the PC 1 may also set the media port once again after the control session has been established, without including in the 200 OK information to the effect that the media information will not be used.

The PC 1 according to the embodiments that have been described above is a general-purpose device, because it is able to perform different processing according to whether the calling device is compatible with the immediate establishment procedure (refer to Step S101 in FIG. 13 and the like). However, as long as it can be determined that the calling device is compatible with the immediate establishment procedure, the present disclosure can be implemented even if the processing at Steps S101 to S113 in FIG. 13 is not performed.

What is claimed is:

1. A communication device for performing Peer-to-Peer (P2P) communication with another communication device by establishing a session with the other communication device through a server that performs transmitting and receiving of data, the communication device comprising:

a processor; and memory storing computer-readable instructions that, when executed, cause the communication device to execute:

first transmitting of a first response message to the other communication device through the server, in a case where the communication device is requested to establish the session by the other communication device, and upon the communication device receiving a session start message, the first response message including information on a first port for receiving, from the other communication device without the server, a control message for establishing the session, the control message including information necessary to perform P2P communication with the other communication device;

establishing the session with the other communication device by transmitting the control message to a second port specified by information in one of the session start message and a second response message received from the other communication device through the server; and starting transmitting and receiving of media data to and from the other communication device after the session has been established.

2. The communication device according to claim 1, wherein the first transmitting comprises transmitting the first response message including information on port for receiving the control message for establishing the session from the other communication device without the server.

3. The communication device according to claim 1, wherein the computer-readable instructions, when executed, further cause the communication device to execute:

upon receiving, from the server, the session start message transmitted from the other communication device, second transmitting, to the other communication device through the server, a provisional response message in response to the received session start message in a case where the received session start message does not include the information specifying the second port; and determining, in a case where the session start message transmitted from the other communication device has been received through the server, and based on information included in the received session start message, which one of transmitting of the first response message in the first transmitting and transmitting of the provisional response message in the second transmitting will be performed, wherein one of the first transmitting and the second transmitting transmits the corresponding one of the first response message and the provisional response message only upon determining that one of the first response message and the provisional response message will be transmitted.

4. The communication device according to claim 3, wherein the determining that the first response message will be transmitted in the first transmitting if information on a port for the other communication device to receive the control message without the server is included in the session start message received through the server, and wherein the determining determines that the provisional response message will be transmitted in the second transmitting if the information on the port is not included in the session start message received through the server.

5. The communication device according to claim 3, wherein the determining determines that the first response message will be transmitted in the first transmitting if additional information, indicating that the other communication device is compatible with an immediate establishment procedure, is included in the session start message received through the server, the immediate establishment procedure being a procedure configured to establish the session with the other communication device before accepting a command of a user, and wherein the determining determines that the provisional response message will be transmitted in the second transmitting if the additional information is not included in the session start message received through the server.

6. The communication device according to claim 1, wherein the first transmitting comprises transmitting the first response message including information indicating that the media data will not be transmitted to a media port that is a port through which the other communication device is configured to receive media data, in a case where information on the media port has been included in the session start message received through the server.

7. The communication device according to claim 1, wherein the computer-readable instructions, when executed, further cause the communication device to execute:

in a case where the communication device requests the other communication device to establish the session, third transmitting to the other communication device through the server another session start message that includes information on a third port for receiving a control message from the other communication device without the server.

8. The communication device according to claim 7, wherein the third transmitting comprises transmitting the session start message including information on a port for receiving the control message for establishing the session from the other communication device without the server.

9. A non-transitory computer-readable medium storing instructions that, when executed, cause a communication device that, by establishing a session with another communication device through a server that performs transmitting and receiving of data, performs peer-to-peer (P2P) communication with the other communication device, to execute:

first transmitting to the other communication device through the server, in a case where the communication device is requested to establish the session by the other communication device, and upon the communication device receiving a session start message transmitted through the server from the other communication device, a first response message including information on a first port for receiving, from the other communication device without the server, a control message for establishing the session, the control message including information necessary to perform P2P communication with the other communication device;

establishing the session with the other communication device by transmitting the control message to a second port specified by information in one of the session start message and a second response message received from the other communication device through the server; and starting transmitting and receiving of media data to and from the other communication device after the session has been established.

10. The non-transitory computer readable medium according to claim 9, wherein the first transmitting comprises transmitting the first response message including information on a port for receiving the control message for establishing the session from the other communication device without the server.

11. The non-transitory computer readable medium according to claim 9, further comprising:

second transmitting to the other communication device through the server, upon the receiving from the server of the session start message transmitted from the other communication device, a provisional response message in response to the received session start message in a case where the received session start message does not include the information specifying the second port; and determining, in a case where the session start message transmitted from the other communication device has been received through the server, and based on information that is included in the received session start message, which one of the transmitting of the first response message and the transmitting of the provisional response message will be performed, wherein the one of the first response message and the provisional response message is transmitted only upon determining that the one of the first response message and the provisional response message will be transmitted.

12. The non-transitory computer readable medium according to claim 11, wherein determining which one of the transmitting of the first response message and the transmitting of the provisional response message will be performed includes determining that the first response message will be transmitted if information on a port for the other communication device to receive the control message without the server is included in the session start message received through the server, and wherein determining which one of the transmitting of the first response message and the transmitting of the provisional response message will be performed includes determining that the provisional response message will be transmitted if the information on the port is not included in the session start message received through the server.

13. The non-transitory computer readable medium according to claim 11, wherein determining which one of the transmitting of the first response message and the transmitting of the provisional response message will be performed includes determining that the first response message will be transmitted if additional information that indicates that the other communication device is compatible with an immediate establishment procedure is included in the session start message received through the server, the immediate establishment procedure being a procedure that is able to establish the session with the other communication device before accepting the command of the user, and wherein determining which one of the transmitting of the first response message and the transmitting of the provisional response message will be performed includes determining that the provisional response message will be transmitted if the additional information is not included in the session start message received through the server.

14. The non-transitory computer readable medium according to claim 9, wherein the first transmitting comprises transmitting the first response message including information indicating that the media data will not be transmitted to a media port that is a port through which the other communication device is configured to receive media data, in a case where information on the media port has been included in the session start message received through the server.

15. The non-transitory computer readable medium according to claim 9, further comprising:

third transmitting, to the other communication device through the server, in a case where the communication device requests the other communication device to establish the session, another session start message that includes information on a third port for receiving the control message from the other communication device without the server.

16. The non-transitory computer readable medium according to claim 15, wherein the third transmitting comprises transmitting the session start message including information on a port for receiving the control message for establishing the session from the other communication device without the server.

17. The computer readable medium according to claim 9, wherein the first transmitting comprises transmitting the first response message including a control session port, wherein the control session port includes information on the number of the first port after receiving a media port included in the session start message from the other communication device.

18. The computer readable medium according to claim 9, wherein the first transmitting comprises transmitting the first response message represented as a 200 OK message after receiving the session start message represented as an INVITE message from the other communication device.

19. A communication method implemented by a communication device that, by establishing a session with another communication device through a server that performs transmitting and receiving of data, performs peer-to-peer (P2P) communication with the other communication device, the communication method comprising:

first transmitting to the other communication device through the server, in a case where the communication device is requested to establish the session by the other communication device, and upon the communication device receiving by a session start message transmitted through the server from the other communication device, a first response message including information on a first port for receiving, from the other communication device without the server, a control message for establishing the session, the control message being information necessary to perform P2P communication with the other communication device;

establishing the session with the other communication device by transmitting the control message to a second port specified by information in one of the session start message and a second response message received from the other communication device through the server; and starting transmitting and receiving of media data to and from the other communication device after the session has been established.

20. The communication method according to claim 19, further comprising:

second transmitting to the other communication device through the server, in a case where the communication device requests the other communication device to establish the session, a session start message that including information on a second port for receiving the control message from the other communication device without the server.

* * * * *